United States Patent [19]

Sutton

[11] Patent Number: 4,961,223
[45] Date of Patent: Oct. 2, 1990

[54] SHOULDER REST FOR CELLULAR-TELEPHONE HANDSET

[76] Inventor: Bernard S. Sutton, P.O. Box 022550, New York, N.Y. 11202-0053

[21] Appl. No.: 334,688

[22] Filed: Apr. 7, 1989

[51] Int. Cl.⁵ ............................................. H04M 1/00
[52] U.S. Cl. .................................... 379/449; 379/454; 379/455
[58] Field of Search ............... 379/447, 449, 450, 454, 379/455

[56] References Cited

U.S. PATENT DOCUMENTS

| | | | |
|---|---|---|---|
| 2,294,989 | 9/1942 | Keely | 379/449 |
| 2,348,138 | 5/1944 | Latus et al. | 379/449 |
| 2,476,221 | 7/1949 | Renneker | 379/449 |
| 2,493,954 | 1/1950 | Epstein | 379/449 |
| 2,575,306 | 11/1951 | Van Dyke | 379/449 |
| 2,640,111 | 5/1953 | Samsky et al. | 379/449 |
| 2,785,234 | 3/1957 | del Busto | 379/449 |
| 2,802,062 | 8/1957 | Dalton | 379/449 |
| 2,816,963 | 12/1957 | Norton | 379/449 |
| 3,347,998 | 10/1967 | Cunningham | 379/449 |
| 3,567,871 | 3/1971 | Walter | 379/449 |
| 4,556,762 | 12/1985 | Campbell | 379/450 |
| 4,736,417 | 4/1988 | Van Dyke | 379/449 |
| 4,759,058 | 7/1988 | Sutton | 379/449 |

*Primary Examiner*—Jin F. Ng
*Assistant Examiner*—Jhancy Augustus
*Attorney, Agent, or Firm*—Charles E. Baxley

[57] ABSTRACT

A shoulder rest used on a cellular-telephone handset has a forwardly directed mouthpiece, a forwardly directed earpiece spaced therefrom, and a relatively thick stem extending therebetween and itself having a back face provided with control buttons. The shoulder rest has a curved cradle shaped to fit over the shoulder of a user of the handset and a stem projecting upward from the cradle and having an upper end. A holder body fixable in a plurality of angularly offset positions to the upper end of the stem carries a pair of U-shaped clips spaced apart on the holder and each adapted to embrace a respective end of the handset across the back face thereof. Respective tightening elements are operable to close the clips on edges of the handset.

1 Claim, 2 Drawing Sheets

SHOULDER REST FOR CELLULAR-TELEPHONE HANDSET

FIELD OF THE INVENTION

The present invention relates to a shoulder rest for a telephone handset. More particularly this invention concerns such a rest adapted specifically for use with the handset of a cellular telephone.

BACKGROUND OF THE INVENTION

It is known for example from my U.S. Pat. No. 4,759,058 to provide a standard desktop-telephone handset with a shoulder rest basically comprising a contoured shoulder cradle adapted to sit on the user's shoulder and a clamp arrangement that engages the back of the handset. Thus the telephone is supported on the user's shoulder against his or her ear, and the user's hands are left free for other tasks. In such a system (see also U.S. Pat. Nos. 2,348,138, 2,476,221, 2,493,954, 2,816,963 and 3,567,871 as well as British patent No. 726,879 and German patent document 2,004,701) the clamp or clip always engages the back part of the stem extending between the mouthpiece and earpiece of the handset.

Such arrangements are not, however, usable on a standard cellular-telephone handset because invariably such a handset carries substantially all of the dialing and operating buttons and incorporates substantial circuitry. Thus such a handset typically is of substantially the same width from its upper earpiece end to its lower mouthpiece end from which the cord extends, that is it is as wide at the stem as at both ends. For comfort such a handset is not straight, either being curved or formed of two parts extending at a wide obtuse angle to each other. The buttons are provided on the back of the handset so that they can be operated with one hand, normally when the device is cradled, and so that they do not get in the way of the user's chin when the handset is being talked into.

Unfortunately such a construction militates against the use of a shoulder rest because only very few shoulder-rest units can actually be clamped to such handsets and none of the known models can be fitted to the handsets without rendering them useless. This is particularly troublesome as such telephones are usually provided in automobiles and are used by persons who are simultaneously driving their vehicles. The phone therefore takes one hand away from the task of driving, creating a potential safety problem.

A partial solution to this problem has been the provision of so-called hands-free telephones which are nothing other than speaker-phone adapters. These devices add, however, to the normally already marginal sound quality of cellular telephones, so that they represent at best a poor answer to the problem of how to use a cellular telephone safely while driving.

OBJECTS OF THE INVENTION

It is therefore an object of the present invention to provide an improved shoulder rest, in particular one usable with a cellular-telephone handset.

Another object is the provision of such an improved shoulder rest, in particular one usable with a cellular-telephone handset which overcomes the above-given disadvantages, that is which does not interfere with standard use of the handset.

SUMMARY OF THE INVENTION

The instant invention is a shoulder rest used on a cellular-telephone handset having a forwardly directed mouthpiece, a forwardly directed earpiece spaced therefrom, and a relatively thick stem extending therebetween and itself having a back face provided with control buttons. The shoulder rest has a curved cradle shaped to fit over the shoulder of a user of the handset and a stem projecting upward from the cradle and having an upper end. A holder body fixable in a plurality of angularly offset positions to the upper end of the stem carries a pair of U-shaped clips spaced apart on the holder and each adapted to embrace a respective end of the handset across the back face thereof. Respective tightening elements are operable to close the clips on edges of the handset.

Thus with this system the holder can grip the handset at its ends in such a manner as to leave the buttons on the back face of the handset exposed and usable. The user can therefore brace the handset against his or her shoulder and keep both hands on the wheel. The rest does not otherwise interfere with operation of the back-mounted buttons and viewing of the back-mounted display, and allows the handset to be cradled when not in use.

According to another feature of this invention the upper end of the stem is provided with a pivot about which the holder can move angularly about an axis generally parallel to the longitudinal axis of the handset. The rest is provided with structure for angularly locking the holder relative to the stem on the pivot so that once a comfortable position is found, it can be set.

Each clip is V-shaped, open away from the cradle, and has a pair of arms, the respective tightening elements bridging the arms. Each such clip further has at each arm an L-shaped tab adapted to engage the handset and the tightening elements bridge the tabs. These tightening elements are each a screw extending from one of the respective tabs and threadedly engaging the other respective tab.

In accordance with a further feature of this invention one of the clips is provided with an abutment plate engageable with the end of the handset adjacent the earpiece thereof.

DESCRIPTION OF THE DRAWING

The above and other objects, features, and advantages will become more readily apparent from the following, reference being made to the accompanying drawing in which.

SPECIFIC DESCRIPTION

Figure 1:
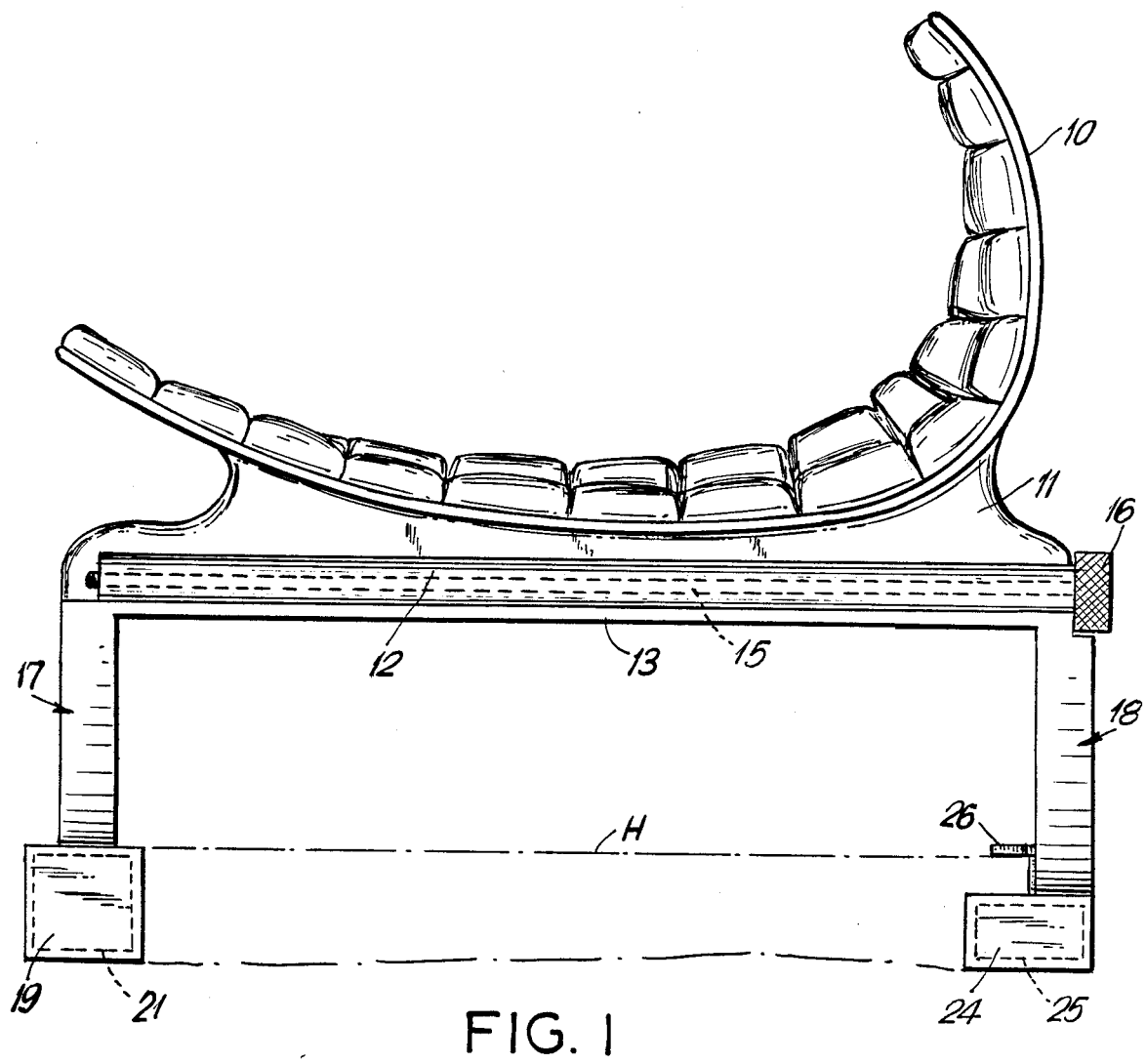
FIG. 1 is a side view of the shoulder rest according to this invention.
Figure 2:
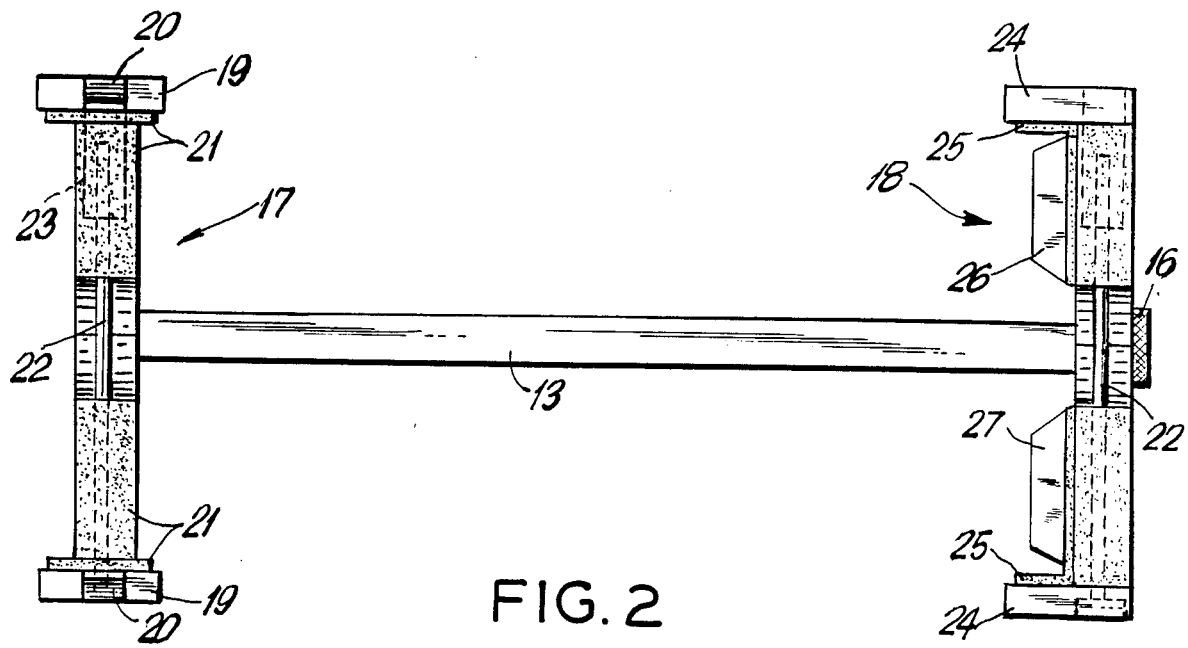
FIG. 2 is a bottom view of the holder of the rest of FIG. 1.

As seen in FIGS. 1 and 2 the shoulder rest according to this invention is intended for use with a standard basically parallepipedal handset indicated in dashed lines at H. The rest has a cradle 10 identical to that described in my above-mentioned U.S. Pat. No. 4,759,058 to which reference should be made for more details. This cradle 10 has a stem or connection part 11 formed as an elongated split-cylindrical tube 12 (FIGS. 3 and 4) centered on an axis A.

A holder 13 has a cylindrical rod 14 received within the split tube 12 whose split is sufficiently wide that the holder 13 can move limitedly angularly relative to the cradle 10 about the axis A. The cradle 10 and holder 13 can be locked angularly relative to one another by a screw 15 extending along the axis A and has a knurled end 16 so that it can be tightened or loosened by hand. This allows the rest to be used on either the right or left shoulder, according to the user's preference.

Extending from the ends of the rods 14 are substantially identical V-shaped clips 17 and 18 respectively adapted to engage the handset H at the mouthpiece and earpiece and made integrally with the rod 14 of a flexible but stiff synthetic resin.

Figure 4:
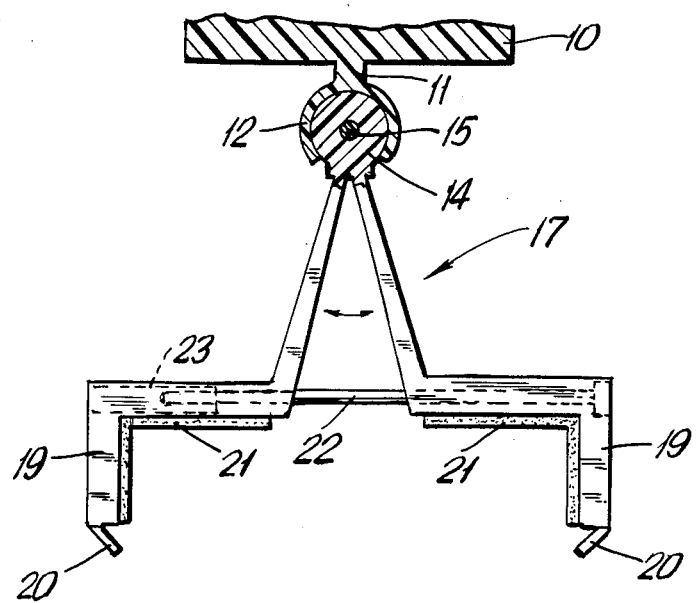
Figure 5:
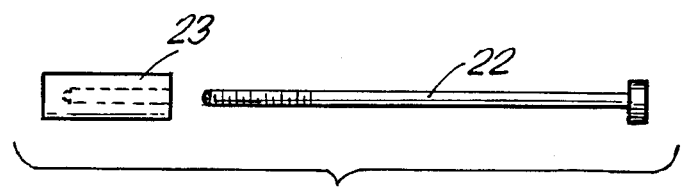
FIG. 5 is a side view of details of the structure.

As seen in detail in FIG. 4 the clip 17 has a pair of L-shaped tabs 19 each having one leg adapted to sit flat on the back of the handset H adjacent the mouthpiece and another leg that engages around the side in this region and provided with a tab 20 that even engages slightly around the front of the handset 20. Each of these tabs 19 is provided with a soft pad 21 that prevents the handset H from getting scratched. The two tabs 19 are bridged by a screw 22 whose head bears on the one tab 19 and whose other end is threaded into a nut 23 in the other tab 19, there normally being a protecting plate under the screw head to prevent it from biting into the synthetic-resin of the clip 17. Thus the screw 22 can be tightened to bring the two arms of the clip 17 together and press the tabs 19 against the sides of the handset.

Figure 3:
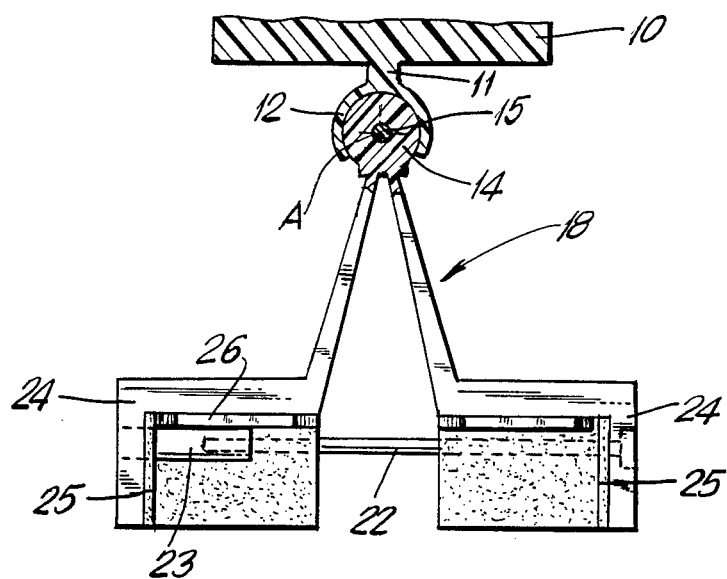
FIGS. 3 and 4 are end views of the right- and left-hand ends of the shoulder rest.

FIG. 3 shows the substantially similar other clip 18 of the holder 13. It is provided, however, with tabs 24 that extend longitudinally inward and that are provided with soft pads 25. Support plates 26 are provided on the clip 18 to engage the back face of the handset H just above the display normally provided on the back of the earpiece, and another cross plate 27 is provided to engage the upper end of the handset H at the earpiece.

Thus the handset is held solidly. It is grasped on its edges adjacent both edges and its back face also rests at both ends on the respective clips 17 and 18. In addition at the upper earpiece end the handset H abuts the plate 27, so that there is substantially no possibility of the handset H coming free.

I claim:

1. In combination with a cellular telephone handset having a forwardly directed mouthpiece, a forwardly directed earpiece spaced therefrom, and a relatively thick shank extending therebetween, the shank having a back face provided with control buttons, a shoulder rest comprising:

a contoured cradle for mounting the handset on a user's shoulder, the cradle comprising a contoured stiff elongated base and a cushioned material mounted on the base, the cushioned material arranged to abut comfortably the user's shoulder.

A stem projecting upwardly from the cradle and having an upper end provided with a pivot comprising a split cylinder arranged along the base and adapted to receive a bearing whereby the bearing can move angularly relative to the split cylinder, and locking means for locking the bearing relative to the split cylinder;

a holder body connected fixedly to the bearing and including a pair of V-shaped clips opening away from the cradle and spaced apart on the holder and each having a pair of arms adapted to embrace a respective end of the handset across the back face of the stem;

respective tightening elements bridging the arms and operable to close the clips on edges of the handset, each tightening element including a screw extending from one arm to the other.

* * * * *